United States Patent Office 3,404,734
Patented Oct. 8, 1968

3,404,734
METHOD OF PLUGGING FORMATIONS BY IN SITU CHEMICAL MEANS
Philip J. Raifsnider, Denver, Colo., and Joseph S. Levine, Houston, Tex., assignors to Shell Oil Company, New York, N.Y., a corporation of Delaware
No Drawing. Filed Apr. 17, 1967, Ser. No. 631,191
6 Claims. (Cl. 166—32)

ABSTRACT OF THE DISCLOSURE

A method of plugging an earth formation comprising injecting into said formation a hydrocarbon solution containing a polymerized unsaturated fatty acid followed by an aqueous alkaline solution capable of interacting with the polymerized unsaturated acid to form a gel-like precipitate plugging material.

---

The present invention relates to a new and novel method of sealing or plugging formations particularly to the intrusion of water. The invention is particularly concerned with improved methods of recovering petroleum from underground formations by selectively plugging or sealing off water or brine passages in said formations so as to prevent liquids from coming in contact with gaseous and/or liquid drilling fluids used in forming boreholes for petroleum recovery or with the petroleum product being recovered from such formations by suitable recovery means.

As indicated, the necessity of plugging formations susceptible to water seepage during air, gas or aerated fluid drilling or petroleum recovery is essential since under these conditions water intrusion destroys the effectiveness of the drilling fluids and has an adverse effect on petroleum production. Thus, when a well is being drilled with a gas as a circulated fluid and water enters the well, the water tends to trap the bit cuttings preventing their being blown out of the well by the circulated gas. The bit cuttings become dispersed by hydration and mechanical action to form a viscous mud in the bottom of the well or "ball-up" and stick together and completely prevent removal of cuttings from the hole. This can cause abandonment of the gas as the circulating fluid and adoption of a liquid circulating agent. The result is a slower drilling rate characteristic of using a liquid as the circulating fluid. Also, improper plugging or sealing of the formation around an oil well during drilling results in loss of the drilling fluid without deriving maximum benefits therefrom.

In the production of petroleum from underground formations penetrated by wells, it is essential to prevent water and gas coning due to the presence of water and gas in said formations by effectively plugging or sealing such formations so that maximum petroleum recovery can be achieved when using various recovery techniques. Plugging or sealing of certain portions of the formations is also necessary to prevent thief zones which if not effectively plugged result in loss of oil recovery and driving fluids used in the process of petroleum recovery such as water, steam, solvents and the like. Also, if these conditions are not remedied by proper plugging maximum efficiency and benefits from drilling, driving and recovery of fluids are not derived resulting in economic losses.

It is well known in the art that various means are employed to plug or seal formations to prevent intrusion into the petroleum formation or wells of undesired water and/or gases or to prevent loss of fluids into thief zones etc., among which are included bulky solid materials, resinous materials, greases and various gelatinous chemical compounds and the like. Generally, such materials have been found to be ineffective because of their inability to effectively plug different formations or the difficulties in handling them or their tendencies to break down under working conditions encountered while drilling or recovering petroleum from formations.

It is an object of the present invention to plug earth formations and render them impervious to intruding fluids. Still another object is to plug underground formations to the intrusion of water and gases in recovering petroleum from underground formations. Still another object of the present invention is to shut off water flow during air drilling by plugging the formation around the borehole being drilled and theif zones in water injection wells. Still another object of the present invention is to effectively plug thief zones, water zones, flooded-out zones, etc., by means of in situ chemical means. It is another object of this invention to improve production of petroleum from subterranean formations by chemical treatment of said formations with gel forming reagents capable of selectively plugging portions of the formation which resultant gel products are oil and water insoluble. These and further objects of the invention will become apparent from the following detailed description of the invention.

In general, the above and other objects of the present invention are accomplished, namely that of sealing and plugging earth formations by injecting into the zones or areas to be plugged a hydrocarbon solution containing a polymerized unsaturated fatty acid followed by an aqueous alkaline solution in an amount sufficient for the polymerized unsaturated fatty acid and alkaline material to interact and form a water and oil insoluble gel-like precipitate plugging material. The invention is particularly applicable in plugging of subterranean formations penetrated by injection and production wells and under such conditions the steps in carrying out the plugging of formations consist of:

(1) Injecting a hydrocarbon solution containing from about 5 to about 45%, preferably from about 15 to 35%, of a polymerized (high molecular weight) unsaturated fatty acid such as dimerized or trimerized linoleic acid and mixtures thereof, and (2) Injecting an aqueous alkaline solution, preferably a saturated aqueous alkaline solution, capable of reacting with solution (1) and form an oil and water insoluble precipitate which effectively plugs and seals the formation and is resistant to water or solvent dissolution or to destruction due to changes of temperature and pressures normally encountered in subsequent conventional recovery of petroleum by water and/or solvent flooding or thermal driving techniques such as hot water and/or steam and the like.

The polymerized fatty acids are formed by polymerizing unsaturated aliphatic hydrocarbon fatty acids containing at least two ethylene linkages of between about 16 and about 22 carbon atoms to their dimer stage. In the case of linoleic acid, the dimerization reaction is postulated as follows:

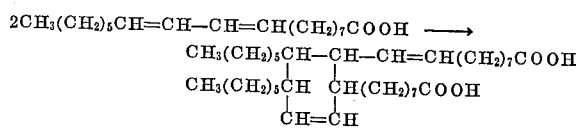

Other acids which dimerize in this manner include linoelaidic, linolenic, licanic, arachidonic, clupanodonic and eleostearic. In general, the polymerization is carried out simply by heating the monomeric acid at an elevated temperature, e.g., about 250° C., while avoiding decarboxylization and cracking. A typical dimerized acid is available commercially from Emery Industries as Empol 1022 which has the following properties:

| | | |
|---|---|---|
| Dimer content | percent | 75 |
| Trimer content | do | 22 |
| Monomer content | do | 3 |
| Specific gravity at 15.5° C./15.5° C. | | 0.95 |
| Flash point, °F. | | 530 |
| Fire point, °F. | | 600 |
| Viscosity at 25° C., (Gardner-Holdt) | | Z4 |
| Viscosity at 25° C., centistokes | | 10,000 |
| Viscosity at 100° C., centistokes | | 100 |
| Solubility—Insoluble in water, soluble in alcohol, ether, benzene, acetone and naphtha. | | |

Other polymerized acids are commercially available from the Harchem Division of Wallace and Tiernan Company under the tradename of D-50 Acid, or from Rohm and Hass Company under the tradename VR-1 Acids. Such acids may be also produced as by-product still-residues in the manufacture of sebacic acid by the distillation of castor oil in the presence of caustic and is described in U.S. 2,470,849. The mixture normally comprises of monomers, dimers, trimers and higher polymers having a molecular weight in the range of from about 300 to 600, and higher acid mixtures which are mainly a mixture of polymeric long chain polybasic carboxylic acids, generally having the following properties:

| | |
|---|---|
| Acid No. | 150–164 |
| Saponification No. | 175–186 |
| Free fatty acids, percent | 75–82 |
| Iodine value | 44–55 |

Although the above are examples of commercially available mixed polycarboxylic acids, other polycarboxylic acids derived by polymerization of unsaturated acids and corresponding oil soluble polycarboxylic acid type materials, e.g., lecithin, also may be used. Also, various naturally occurring or synthetic acids may be linked together to provide useful polycarboxylic acids by means well known to organic chemists, e.g., polymerization of unsaturated acids or condensation of alpha-halogenated acids, to produce polymeric forms of readily available carboxylic acids such as lauric, stearic, oleic, linoleic, oxo acids (e.g., isooctyl acids), synthol acids and the like.

The hydrocarbon carrier for the polymerized acid can be suitable light liquid petroleum products such as gasoline, kerosene, mineral seal oil, petroleum solvents, diesel oil or any petroleum having generally a boiling range below that of lubricating oil of which preferred are kerosene and diesel oil.

The aqueous alkaline solution which on contact with the polymerized acid solution form a water and oil insoluble precipitate capable of plugging formations can be any aqueous solution containing alkali and/or alkaline earth metal hydroxides, carbonates, halides or organic derivatives thereof such as sulfonates, phosphates and the like. Compounds of this type can include sodium, potassium, calcium and/or barium hydroxides, carbonates, chlorides, bromides, sulfonated hydrocarbons, sulfonated fats and oils or fatty acids, e.g., Na $C_{12-15}$ alkyl aryl sulfonate, Na petroleum sulfonate, Na polyalkane sulfonate, Na or K alkyl, aryl or alkaryl phosphates and mixtures thereof of which are preferred sodium hydroxide, calcium hydroxide and sodium $C_{12}$ alkyl benzene sulfonate and mixtures thereof. The solution should be preferably a saturated solution such as a saturated aqueous sodium hydroxide solution.

In demonstrating the effectiveness of the process of the present invention in plugging formations in situ with an oil and water insoluble precipitate or gel-like material, the following tests were run in which two groups of cores were used: (1) the first group was thoroughly cleaned and dried prior to the plugging tests and (2) the second group were virgin samples still containing crude oil and possibly some formation water. In all the tests, a water flow rate was first measured either on the clean core or on the virgin core. Then about one pore volume of the acid-kerosene mixture was flowed into the core and was followed by about one pore volume of a water solution of sodium hydroxide, sodium $C_{12}$ alkyl aryl sulfonate having the formula

or calcium hydroxide. After the core had then sat for several hours, the water flow rate was again measured. In some cases the flow direction was also reversed in order to see if the plug could be more easily removed from the core. Also in some cases, a second or third acid-chemical treatment was given to see if further reductions in flow rate could be achieved.

The results are summarized in Table I.

TABLE I.—RESULTS OF CORE PLUGGING TESTS WITH CHEMICAL SOLUTIONS

| Example | Core condition | Percent by volume of dimer acid in mixture | Aqueous solution | Water flow rate, cc./min. | | | Final reduction in flow rate, percent |
|---|---|---|---|---|---|---|---|
| | | | | Before plugging | Immed. after plugging | Final | |
| 1 | Clean | 30 | 50 gm. NaOH/100 cc | 77 | 0.5 | 0.1 | >99 |
| 2 | do | 10 | Satd. Na $C_{12-15}$ alkyl aryl sulfonate | 116 | 43 | 52 | 55 |
| 3 | Clean, partially plugged | 10 | do | 52 | 35 | 37 | 29 |
| 4 | do | 10 | do | 37 | 1 | 2 | 94 |
| 5 | Clean | 10 | Satd. Ca(OH)$_2$ | 65 | 2 | 4 | 94 |
| 6 | Virgin | 10 | do | 98 | 50 | 87 | 11 |
| 7 | Virgin, partially plugged | 10 | Satd. Na $C_{12-15}$ alkyl aryl sulfonate | 84 | 23 | 37 | 56 |
| 8 | do | 20 | do | 13 | 1 | 8 | 39 |
| 9 | Virgin | 20 | do | 36 | 5 | 10 | 72 |
| 10 | Virgin, partially plugged | 20 | do | 16 | 1 | 7 | 56 |
| 11 | Clean | 20 | do | 71 | 4 | 8 | 89 |

It can be seen from Table I that effective plugging was achieved in all cases. In four cases where the initial plugging was attempted on a clean core, an average reduction of 84 percent of the flow rate was obtained. In the other cases an average reduction of 51 percent of the flow rate was obtained.

Although the plugging precipitates or gels formed by the process of the present invention are resistant to water and oil dissolution, the plugging materials can be removed when desired by injection, preferably in the opposite direction from that of the chemical injection used to form the plugs, by use of solvents such as hot organic solvents such as hot halogenated hydrocarbons, for example, chlorinated alkanes, e.g., chloroform or the like. Thus, formations having injection and production wells in which the plugging agents are injected through the injection wells when it is desired to remove the plugging agents, the solvent for this purpose can be injected through the injection well but preferably through the production wells so that the dissolution solvent flows in the reverse direction to that of the chemical plugging materials.

The process of the present invention can be also used in plugging deep mine shafts, sea walls, river banks or any earth formation from which it is desired to prevent intrusion of water.

We claim as our invention:
1. A method of plugging and sealing earth formations by injecting into said formations a hydrocarbon solution containing a polymerized unsaturated fatty acid and an aqueous alkaline solution capable of interaction with the acid to form a water- and oil-insoluble gel-like precipitate.

2. A method of plugging earth formations with a water- and oil-insoluble gel-like precipitate comprising the steps of introducing into the formation, and
   (1) injecting into the formation a liquid hydrocarbon solution containing from about 5% to about 45% of a polymerized unsaturated fatty acid; and
   (2) injecting an aqueous alkaline solution sufficient to react with the polymerized unsaturated fatty acid and form in the formation a water- and oil-insoluble gel-like precipitate plugging material.

3. The method of claim 2 wherein in solution (1) the polymerized unsaturated fatty acid is a mixture of dimerized and trimerized linoleic acid and the liquid hydrocarbon is a light liquid petroleum.

4. The method of claim 2 wherein the aqueous alkaline solution is a saturated aqueous solution containing alkaline metal compound selected from the group consisting of alkali metal hydroxide, alkaline earth metal hydroxide, alkali metal alkyl aryl sulfonate and mixtures thereof.

5. A method of plugging subterranean formations penetrated by injecting and production wells comprising the steps of introducing into the formation, and (1) injecting into the formation through the injection well a kerosene solution containing from about 15% to about 35% of a mixture of dimerized and trimerized linoleic acid; and
   (2) injecting a saturated aqueous solution of sodium hydroxide sufficient to react with the acids of solution (1) and form in the pores of the formation a water- and oil-insoluble gel-like precipitate plugging material.

6. The method of claim 5 wherein in (2) the saturated aqueous solution contains a mixture of sodium hydroxide and sodium $C_{12-15}$ alkyl aryl sulfonate.

References Cited

UNITED STATES PATENTS

| | | | |
|---|---|---|---|
| 2,747,670 | 5/1956 | King et al. | 166—38 X |
| 2,773,550 | 12/1956 | Wilson | 166—30 X |
| 2,786,530 | 3/1957 | Maly | 166—38 X |
| 2,914,476 | 11/1959 | Alderman et al. | 252—316 X |
| 2,946,748 | 7/1960 | Steiner et al. | 252—316 X |
| 3,358,757 | 12/1967 | Holmes | 166—38 |

STEPHEN J. NOVOSAD, *Primary Examiner.*